Nov. 5, 1968   D. E. PERRY   3,408,928
ARTICLE LOADING APPARATUS

Filed March 1, 1966   4 Sheets-Sheet 1

INVENTOR
D. E. PERRY
BY
Young & Dugg
ATTORNEYS

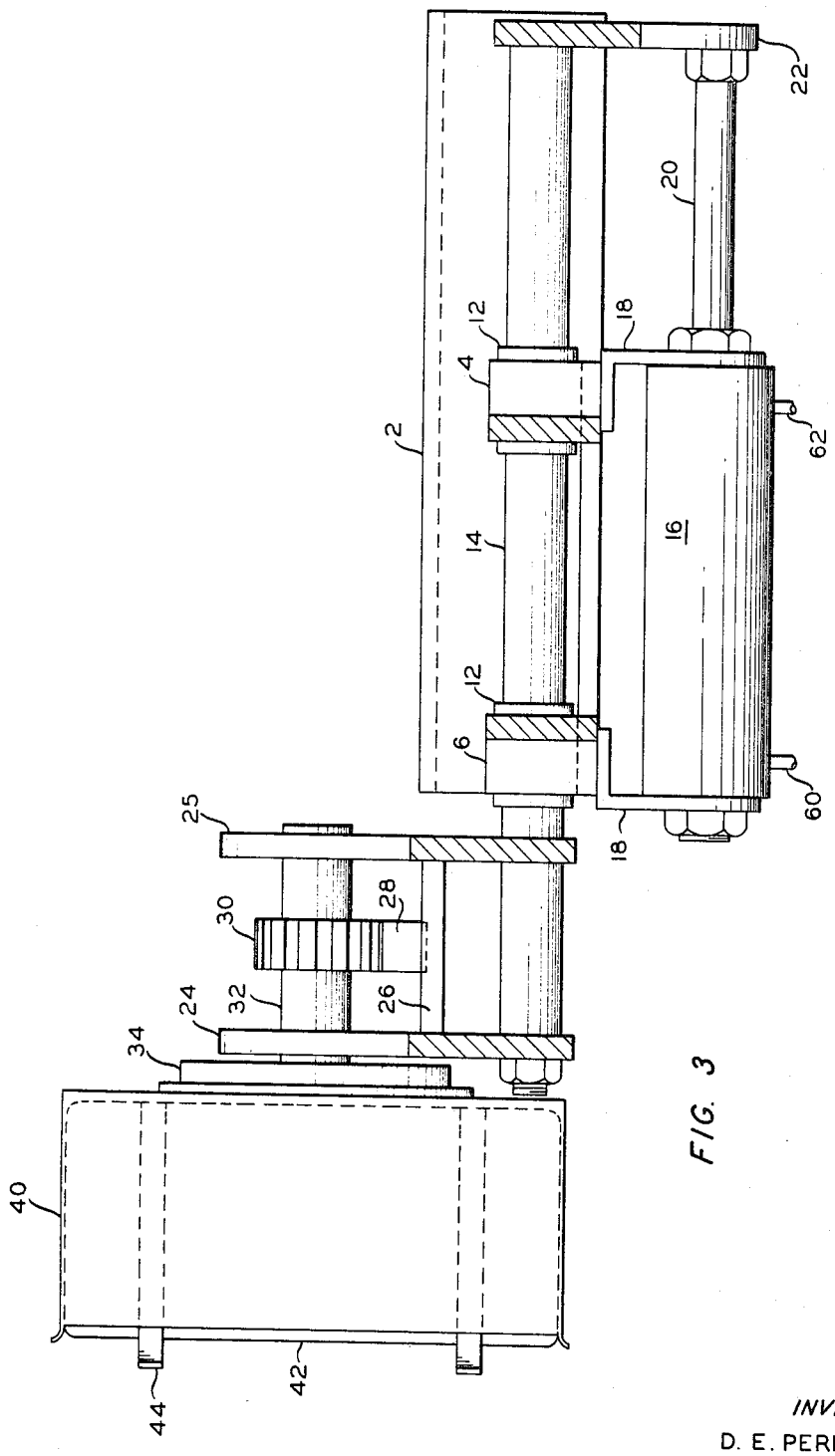

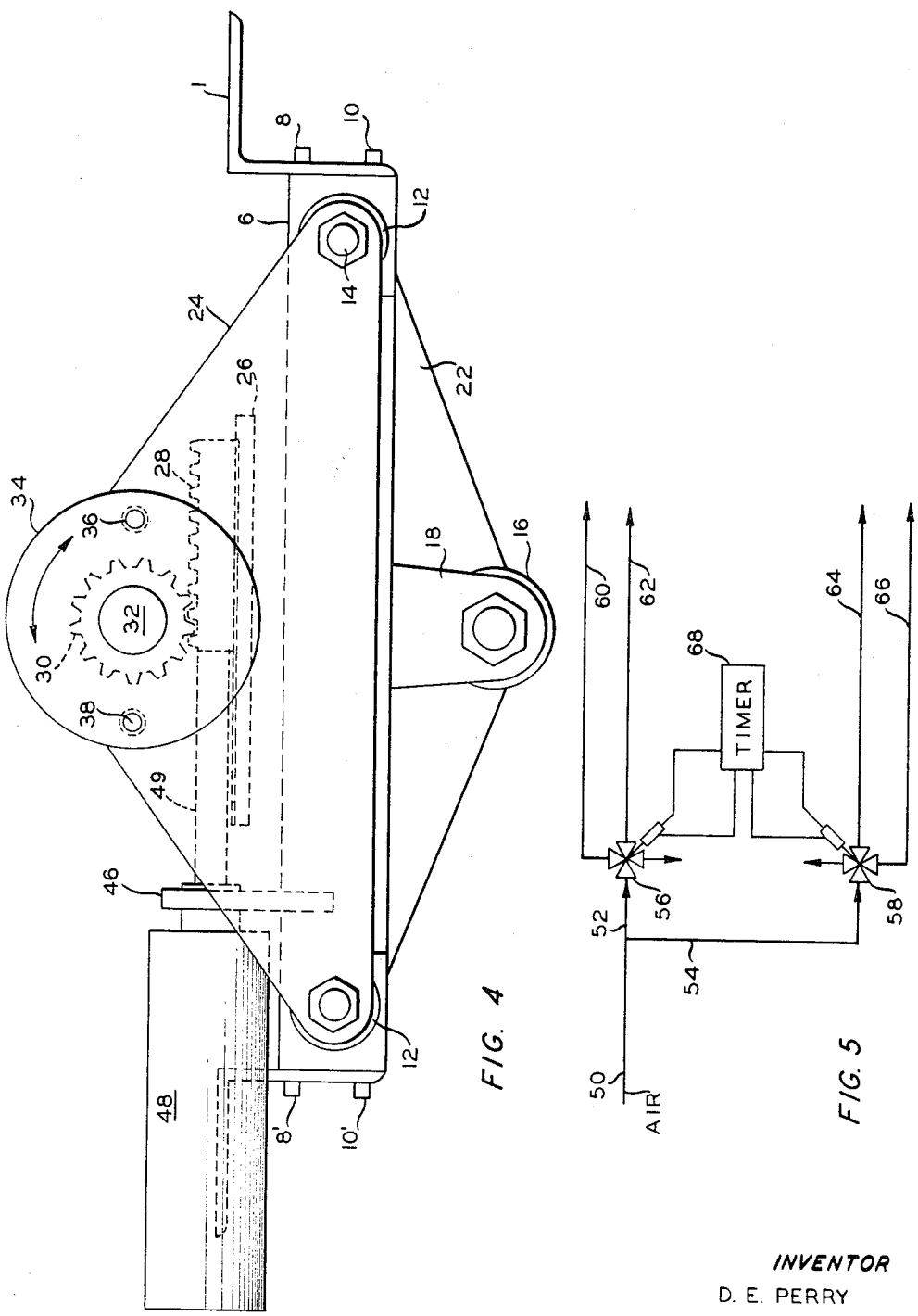

United States Patent Office 3,408,928
Patented Nov. 5, 1968

3,408,928
ARTICLE LOADING APPARATUS
Dan E. Perry, Bartlesville, Okla., assignor to Phillips Petroleum Company, a corporation of Delaware
Filed Mar. 1, 1966, Ser. No. 531,002
7 Claims. (Cl. 101—35)

ABSTRACT OF THE DISCLOSURE

A printing machine having a printing station is provided with means for automatically handling articles to be printed. The handling means comprises an article holding means rotatably mounted on one end of a reciprocating member, means for actuating the member and the article holding means between an extended position and the printing station, and means for selectively rotating the article holding means when in the extended position. Locking means are provided to prevent rotation of the article holding means in the printing station.

Figure 1:
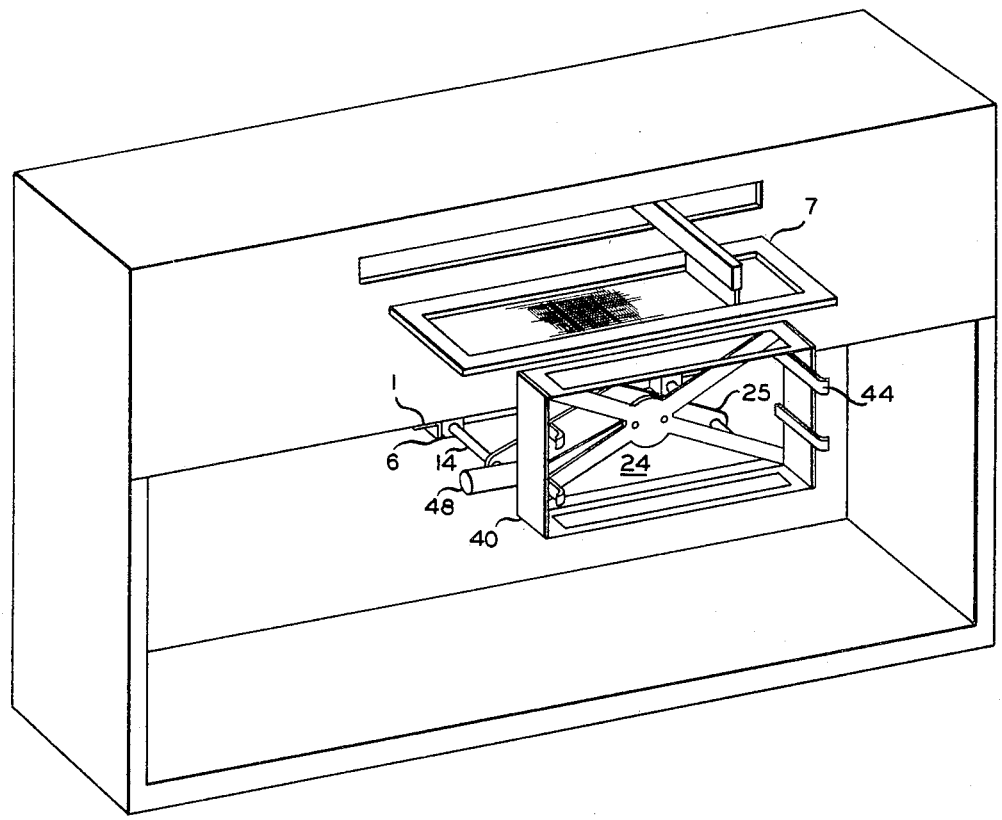

This invention relates to an article loading apparatus. In one of its aspects, it relates to an article loading apparatus for a printer which sequentially prints on opposite sides of the article, the apparatus comprising a clamping means to hold the article intact, a rotating means to rotate the article after it has been printed on one side, and a reciprocating means to extend the clamping means for loading and to retract the clamping means for printing operation. In another of its aspects, the invention relates to an article loading apparatus as hereinbefore described wherein the reciprocating means operates along a line parallel to the axis of rotation of said rotating means. In a still further aspect, the invention relates to an article loading apparatus as hereinbefore described wherein the rotating means is supported by said reciprocating means. In a still further aspect, the invention relates to an article loading apparatus as hereinbefore described wherein the rotating means and the reciprocating means are air operated. In a still further aspect, the invention relates to an article loading apparatus as hereinbefore described wherein there is provided a timer means to actuate the air operated reciprocating means and the air operated rotating means.

In article carriers such as bottle carriers, it is advantageous to place advertising and the like on the sides of the carriers. In bottle carriers such as those described and claimed in Vidal, 3,151,762, the carriers are oftentimes made of thermoplastic material. A silk screen printing operation on opposite sides of the containers has been found advantageous. Heretofore, the articles have been placed under the silk screen printing apparatus, the silk screen printing taking place on one side, the carriers removed and rotated 180° and placed back into the machine for further silk screen printing. All of these operations have been done manually. The cost and motions involved in loading the silk screen printing apparatus are expensive and time consuming.

I have now invented an apparatus which will automatically hold the article carrier, place it under the printing machine to be printed on one side thereof, extend the article, rotate the article, and place it back under the printer for printing on the opposite side. In addition to savings in labor costs, the time consumed in each printing operation is cut 20–30 seconds per article.

By various aspects of this invention, one or more of the following or other objects can be obtained.

It is an object of this invention to provide an automated apparatus for printing on opposite sides of an article.

It is a further object of this invention to provide an automatic loading apparatus for a printing machine wherein the printing takes place on opposite sides of the article.

It is a still further object of this invention to provide an apparatus for printing on opposite sides of a container wherein motion and time for operation are reduced.

Other aspects, objects, and the several advantages of this invention are apparent to one skilled in the art from a study of this disclosure, the drawings and the appended claims.

According to the invention, there is provided a machine for loading a container into a printing operation. The apparatus grips the container on opposite sides, retracts the container into the printing machine, holds the article in printing position while the printing is carried out, extends the article, rotates the article 180°, and retracts the article again for printing on the opposite sides. In one embodiment of the invention, there is provided means for locking the container against rotational movement while the article is in position to be printed. In another embodiment, the article is extended after the second printing operation and rotated 180° so that the cycle can begin anew.

According to a preferred embodiment of the invention, an air cylinder actuates a rack and pinion to rotate the article. Further, a second air cylinder actuates a sliding rod assembly which supports the rack and pinion to extend and retract the assembly. Still further according to the invention, the air cylinders are actuated by a timed air valve assembly system.

Figure 2:
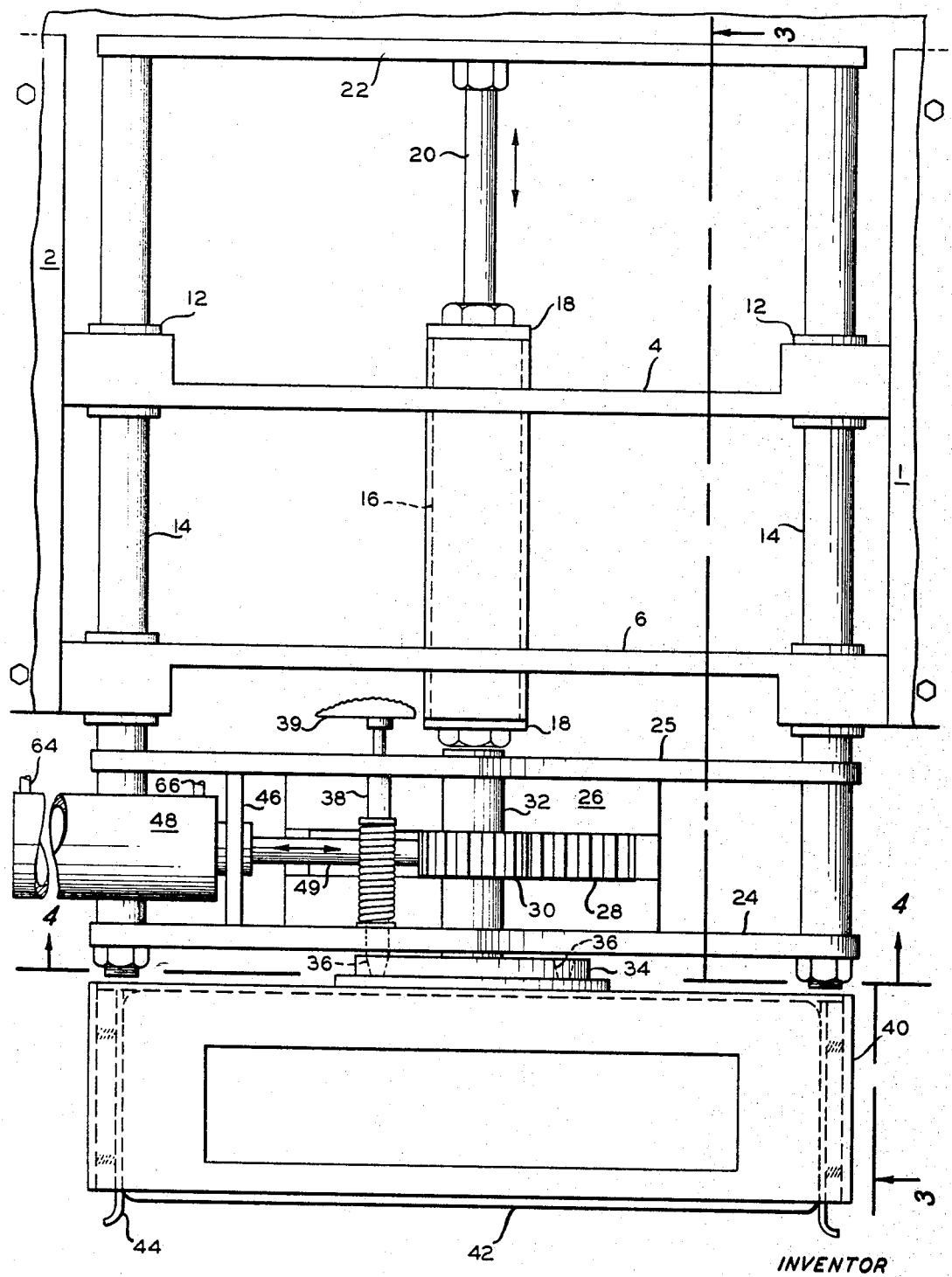

The invention will now be described with reference to the drawings in which FIGURE 1 is an isometric view of an apparatus according to the invention; FIGURE 2 is a top view of the apparatus shown in FIGURE 1; FIGURE 3 is a side view taken along III—III of FIGURE 2; FIGURE 4 is a front elevation along IV—IV of FIGURE 2; and FIGURE 5 is a schematic view of the valve assembly used to operate the air cylinders.

Referring now to the drawings which will be described with reference to loading a bottle carrier into a silk screen printing operation, a silk screen printing apparatus is provided with the loading assembly under the printer means 7. The loading apparatus is attached to the printer by angle supports 1 and 2. Linear bearing housings 4 and 6 are attached at 8 and 10 to support 1 and at 8' and 10' to support 2. Bearing housings 4 and 6 contain, at the ends thereof, sleeves 12 which contain preferably linear ball bearings. The sleeves support rods 14 which are attached to end plate 22. Shaft 20 is also attached to end plate 22 at one end thereof, and at the other end is attached to air cylinder 16. Air cylinder 16 is supported by cylinder mounting plates 18 which are attached to bearing housings 4 and 6. As air cylinder 16 is actuated to move shaft 20 linearly along its axis, rods 14 will be caused to move back and forth along their axis with shaft 20. Rods 14 freely slide through sleeves 12. Attached to the forward end of rods 14 are front bearing housing 24 and rear bearing housing 25. Rigidly attached between front bearing housing 24 and rear bearing housing 25 is rack slide 26. Rotatably mounted in bearing housings 24 and 25 is rod 32 which has rigidly attached thereto spur gear 30. The attachment of gear 30 to rod 32 can be by any suitable means such as by a key and screw combination. Retaining rings can be provided on shaft 32 to bear against the bearing housings to prevent shaft 32 from sliding axially. Also, means such as ball bearings can be provided in the bearing housings at shaft 32 to reduce friction when shaft 32 is rotated about its axis. Rigidly attached to the end of shaft 32 is supporting plate 34 which supports case holder 40 having retractable gripping members 44 to grip an article carrier 42. Plate 34 has a pair of tapered holes in it at 36 spaced 180° apart to receive the tapered end of locking shaft 38 which is mounted in bushings located in housings 24 and 25. A spring retains locking shaft 38 to prevent engagement into holes 36 until air cylinder shaft 20 is in the extended position. Prior to full extension of shaft 20 locking shaft 38 contacts stop 39 causing shaft 38 to enter hole 36 locking carrier for printing.

Also supported by housings 24 and 25 is air cylinder mounting plate 46 which has mounted thereon air cylinder 48, which actuates rod 49 which is attached to rack 28.

Referring now specifically to FIGURE 5, an air supply conduit 50 supplies pressure to conduits 52 and 54 and to valves 56 and 58. Valve 56 is adapted to pass air pressure from line 52 either through line 60 or through line 62. Valve 58 is adapted to pass air pressure from line 54 to either line 64 or line 66. A timer means 68 controls the actuation of valves 56 and 58. Line 60 passes air pressure to the forward end of air cylinder 16, line 62 passes air pressure to the rear end of air cylinder 16, while line 64 passes air pressure to the rear end of air cylinder 48 and line 66 passes air pressure to the forward end of air cylinder 48.

In operation, the assembly will be in extended position with shaft 20 all the way to the rear of air cylinder 16. The carrier 42 will be placed in case holder 40 and secured thereto by grippers 44. A switch in 68 will start the loading operation. Timer 68 sends a signal to valve 56 allowing air to pass through line 52 and line 60 to put air into the forward end of air cylinder 16, thereby extending shaft 20, rods 14, and retracting the holder assembly. The printing operation, in this case silk screen printing operation, will then take place. A predetermined time will be given for the operation. After that predetermined time, timer 68 actuates valve 56 to switch to allow the air pressure in line 52 to pass through line 62 into the rear end of cylinder 16, thus retracting shaft 20 into air cylinder 16, thereby extending rods 14 and case holder 40. Alternately, instead of a timer, valves 56 and 58 could be synchronized with the printing operation so that valve 56 would automatically switch pressure from line 60 to line 62 after the printing operation ceased.

While the assembly is in extended position, timer 68 will actuate valve 58 to allow air pressure to pass through line 54 and line 66 to the forward most end of air cylinder 48. This causes rod 49 to move to the left as shown in FIGURE 4, causing rack 28 to slide to the left, thereby rotating shaft 32 in a clockwise direction as seen from FIGURE 4. After shaft 32 has rotated through 180°, thereby rotating case holder 40 containing carrier 42 through 180°, timer 68 will actuate valve 56 to allow air pressure to pass from line 52 through line 60 to the forward most end of air cylinder 16. The pressure in the forward end of cylinder 16 causes shaft 20 to be extended thereby retracting the case holder assembly. When in position for printing, as shown in FIGURE 2, locking shaft 38 will lock into hole 36 in plate 34 so that the assembly does not rotate in this position. The shaft is similarly locked for the first printing operation. The printing operation then commences and after a predetermined period of time, when the printing is finished, timer 68 actuates valve 56 to switch the air pressure from line 60 to line 62, thereby causing air cylinder 16 to draw shaft 20 forward, thus extending the case holder assembly. Once the assembly is in extended position again, timer 68 actuates valve 58 to switch air pressure from line 66 to line 64 which causes rod 49 and rack 28 to extend to the right, thereby rotating shaft 32 and case holder 40 in a counter clockwise position. The carrier, being printed on both sides, is then removed from case holder 40, a new carrier is inserted, and the operation commences again.

It is obvious to one skilled in the art that the operation can also be carried out omitting the last rotational step. Thus, the operation would rotate the carrier only once for each printing operation, one time clockwise, the second operation rotating the carrier counter clockwise. Thus, the operation would be retract, print, extend, rotate clockwise, retract, print, extend, unload, load, retract, print, extend, rotate counter clockwise, retract, print and extend.

While the operation has been disclosed with regard to printing bottle carriers, it is obvious that other articles can be printed on opposite sides using the apparatus according to the invention.

The invention can be used in connection with a fully automated operation wherein the carriers are pretreated for printing, fed to the loading operation, and automatically loaded into case holder 40. After the printing operation, the carriers could be automatically unloaded and passed to storage.

Although the operation has been described with regard to a silk screen operation, it is obvious that other printing methods can be employed.

Reasonable variation and modification are possible within the scope of the foregoing disclosure, the drawings and the appended claims to the invention, the essence of which is that there has been provided an automatic loading apparatus for a printing operation, the apparatus comprising a means to hold an article, means for retracting the article into printing position, means for locking carrier in position while printing is taking place, means for extending the article, means for rotating the article in extended position, and means for retracting the article for a second printing operation.

I claim:
1. An apparatus for printing an article on more than one side, comprising a printing means having a printing station, and a loading means; said loading means comprising:
   (a) means for holding said article;
   (b) reciprocatable means operatively connected to said holding means adapted to reciprocate said holding means between an extended position and said printing station;
   (c) rotating means associated with said reciprocatable means and said holding means to rotate said holding means and said article contained therein;
   (d) automatic means to actuate said reciprocatable means at a first time to extend said holding means to said extended position for initially loading said article in said holding means, to retract said reciprocatable means at a second time to place said article in said printing station in a position to be printed on a first side of said article, to extend said holding means to said extended position at a third time, to actuate said rotating means to rotate said holding means and said article contained therein when said reciprocatable means and said holding means reach said extended position after said third time, to retract said reciprocatable means and the thus rotated holding means at a fourth time to place said article in said printing station in a position to be printed on a second side of said article, and to extend said reciprocatable means at a fifth time to said extended position to permit the removal of the thus printed article from said holding means.

2. An apparatus according to claim 1 wherein said reciprocatable means comprises a pair of supporting shafts actuated by an air cylinder, said rotating means being attached to the end of said shafts.

3. An apparatus according to claim 2 wherein said automatic means comprises an air valve adapted to pass air pressure to one end of said air cylinder at said first, third and fifth times to extend said holding means to said extended position for loading, rotation, and unloading and adapted to pass at said second and fourth times air pressure to another end of said cylinder to retract said holding means to said printing station for printing said article, and a timer means for actuating said valve means.

4. An apparatus according to claim 1 wherein said rotating means comprises a rack and pinion assembly adapted to rotate said holding means about an axis parallel to the line of movement of said reciprocatable means, said rotating means being actuated by an air cylinder.

5. An apparatus according to claim 4 wherein said air cylinder on said rotating means is actuated by an air valve adapted to pass air to one end of said cylinder to drive said rack in one direction, thereby rotating said holding means in a first direction, and at a subsequent time adapted to pass air to another end of said air cylinder to drive said rack in a second direction, thereby rotating said holding means in the opposite direction, and a timer means for actuating said air valve when said reciprocatable means is in the extended position after said third time and prior to said fourth time.

6. An apparatus according to claim 1 further comprising locking means for locking said rotating means against further rotation when said holding means is in said printing station.

7. An apparatus according to claim 6 wherein said locking means comprises an opening in said holding means, a locking shaft positioned in line with said opening, spring means for biasing said locking shaft out of said opening, and stop means positioned in the path of movement of said reciprocatable means to stop the movement of said locking shaft during the last part of the retracting motion of said reciprocating means to cause engagement of said locking shaft in said opening in said holding means to thereby prevent rotation of said holding means.

References Cited
UNITED STATES PATENTS

| | | | |
|---|---|---|---|
| 763,307 | 6/1904 | Mills. | |
| 2,817,450 | 12/1957 | Ulinski | 214—652 |
| 3,198,366 | 8/1965 | Figenshau et al. | 214—652 |

ROBERT G. SHERIDAN, *Primary Examiner.*

F. E. WERNER, *Assistant Examiner.*